United States Patent
Liu et al.

(10) Patent No.: US 9,910,558 B2
(45) Date of Patent: Mar. 6, 2018

(54) METHODS AND DEVICES FOR USER INTERACTIVE INTERFACES ON TOUCHSCREENS

(71) Applicant: BEIJING XIAOMI Technology CO., LTD., Beijing (CN)

(72) Inventors: Jing Liu, Beijing (CN); Xiaojun Wu, Beijing (CN); Yang Shen, Beijing (CN); Yu Guo, Beijing (CN)

(73) Assignee: Beijing Xiaomi Technology Co., Ltd., Beijing (CN)

( * ) Notice: Subject to any disclaimer, the term of this patent is extended or adjusted under 35 U.S.C. 154(b) by 352 days.

(21) Appl. No.: 13/909,570

(22) Filed: Jun. 4, 2013

(65) Prior Publication Data
US 2013/0326420 A1 Dec. 5, 2013

(30) Foreign Application Priority Data
Jun. 5, 2012 (CN) .......................... 2012 1 0184210

(51) Int. Cl.
*G06F 3/048* (2013.01)
*G06F 3/0482* (2013.01)
*G06F 3/0488* (2013.01)

(52) U.S. Cl.
CPC ........ *G06F 3/0482* (2013.01); *G06F 3/04886* (2013.01)

(58) Field of Classification Search
CPC .................................................... G06F 3/0482
See application file for complete search history.

(56) References Cited

U.S. PATENT DOCUMENTS

| 2004/0212617 A1* | 10/2004 | Fitzmaurice .......... G06F 3/0481 345/440 |
| 2005/0140661 A1* | 6/2005 | Collins ......................... 345/173 |
| 2007/0174782 A1* | 7/2007 | Russo ................. G06F 3/04817 715/781 |
| 2007/0216659 A1* | 9/2007 | Amineh ........................ 345/173 |
| 2008/0168395 A1* | 7/2008 | Ording et al. ................. 715/833 |

(Continued)

FOREIGN PATENT DOCUMENTS

| CN | 101390033 A | 3/2009 |
| CN | 101770331 A | 7/2010 |

(Continued)

OTHER PUBLICATIONS teachmeautocad, Auto Cad (Snap & Grid), May 7, 2008, https://www.youtube.com/watch?v=WZpMWKbGz1g , YouTube.*

(Continued)

*Primary Examiner* — Jeffrey A Gaffin
*Assistant Examiner* — Mohamed Abou El Seoud
(74) *Attorney, Agent, or Firm* — Brinks, Gilson & Lione

(57) ABSTRACT

The present application is directed to devices and methods for touchscreen interactive interface. The method may comprise steps of combining two or more single-function buttons on the user interface of the touchscreen device into one multifunction button; monitoring a real-time touch operation with the multifunction button by a user; determining the type of the touch operation according to the time of the touch operation; and unfolding the two or more single-function buttons one after another around the multifunction button according to the type of the touch operation.

12 Claims, 12 Drawing Sheets

(56) References Cited

U.S. PATENT DOCUMENTS

| | | | | |
|---|---|---|---|---|
| 2008/0244454 | A1* | 10/2008 | Shibaike | 715/835 |
| 2008/0320391 | A1* | 12/2008 | Lemay et al. | 715/702 |
| 2009/0037813 | A1* | 2/2009 | Newman | G06F 3/04883 715/702 |
| 2009/0228820 | A1* | 9/2009 | Kim | G06F 3/04817 715/769 |
| 2009/0327964 | A1* | 12/2009 | Mouilleseaux et al. | 715/834 |
| 2012/0032885 | A1 | 2/2012 | Miller | |
| 2012/0123865 | A1* | 5/2012 | Salzano | G06Q 30/0257 705/14.55 |

FOREIGN PATENT DOCUMENTS

| | | |
|---|---|---|
| CN | 101833389 A | 9/2010 |
| CN | 101946228 A | 1/2011 |
| CN | 101996049 A | 3/2011 |
| CN | 102122229 A | 7/2011 |
| CN | 102216889 A | 10/2011 |
| CN | 102799347 A | 11/2012 |
| JP | 2006-139615 A | 6/2006 |
| JP | 2009-530944 A | 8/2009 |
| JP | 2010-170573 A | 8/2010 |
| JP | 2010-530578 A | 9/2010 |
| JP | 2011-060281 A | 3/2011 |
| JP | 2011-227913 A | 11/2011 |
| KR | 10-2011-0047421 A | 5/2011 |
| KR | 10-2012-0046399 A | 5/2012 |
| RU | 2 450 317 C2 | 5/2012 |
| RU | 2 450 320 C2 | 5/2012 |
| WO | WO 2011-135944 A1 | 11/2011 |

OTHER PUBLICATIONS

International Search Report dated Aug. 22, 2013 in International Application No. PCT/CN2013/076701.
"The Simple Instruction of Assistive Touch Feature," printed from the internet at <https://web.archive.org/web/20120526002812/http://kazoo1837.blog23.fc2.com/blog-entry-168.html>, Oct. 2011, 16 pages (including English language abstract).
Flaminio, Mike, "New iOS5 Assistive Touch Features (First Look)," Jul. 11, 2011, YouTube, 80 pages.
Office Action dated May 6, 2014 for Chinese Application No. 201210184210.1, 9 pages.
Office Action dated Jul. 14, 2015 for Chinese Application No. 201210184210.1, 6 pages.
Office Action dated Dec. 10, 2015 for Chinese Application No. 201210184210.1, 6 pages.
Extended European Search Report dated Apr. 9, 2015 for European Application No. 13799887.8, 6 pages.
Office Action dated Dec. 14, 2015 for Japanese Application No. 2015-513010, 3 pages.
Office Action dated Jan. 22, 2016 for Korean Application No. KR 10-2014-7035115, 7 pages.
Office Action dated Mar. 2, 2016 for Russian Application No. 2014149085/08, 11 pages.
Office Action dated May 23, 2016 for Russian Application No. 2014149085/08, 10 pages.

* cited by examiner

METHODS AND DEVICES FOR USER INTERACTIVE INTERFACES ON TOUCHSCREENS

PRIORITY STATEMENT

This application is based upon and claims the benefit of Chinese Patent Application No. CN 201210184210.1, filed Jun. 5, 2012, the entire contents of which are incorporated herein by reference.

FIELD OF THE INVENTION

The present invention relates generally to touchscreen technology, particularly, the present invention relates to methods and devices for user interactive interfaces on touchscreens.

BACKGROUND

With the development of the wireless communication technology and touchscreen technology, more and more electronic equipment adopt the touchscreen technology, such as touchscreen cellphones and tablet PCs and so on, and become hand-held terminals frequently used by users.

On the user interface of the current touchscreen devices, the user operation point is usually fixed on a certain location. As shown in FIG. 1, taking a touchscreen cellphone for example, it is generally divided into the top touch area and buttons 101, the cellphone supporting component 102, the touchable screen 103 and the bottom touch area and buttons 104. As shown in FIG. 1, the user touchable area of the current touchscreen cellphone is mainly characterized in that there are several fixed buttons on the top and bottom of the cellphone screen for the user's touch operation and the touch area is generally rectangular.

Applicant has found in the research that: as most users use one thumb to operate the touchscreen devices, as shown in FIG. 2, if the screen of the touchscreen device is too large, it will be inconvenient for the user to operate, which will increase unnecessary user action times on the touchscreen device and thus degrade the performance of the touchscreen device.

SUMMARY

A preferred embodiment of the present application provides a user interface interactive method which combines two or more single-function buttons on the user interface of the touchscreen device into one multifunction button. The method may include steps of: monitoring the real-time touch operation with the multifunction button by a user; determining the type of the touch operation according to the time of the touch operation; and unfolding the two or more single-function buttons one after another around the multifunction button according to the type of the touch operation.

In a preferred embodiment, the type of the touch operation may include Type I touch operation and Type II touch operation, which may be determined according to the time of the touch operation. Determining the type of the touch operation may include steps of: judging whether the time of the touch operation satisfies the preset conditions of Type I touch operation. If it does, the type of the touch operation may be determined as Type I touch operation; if not, the type of the touch operation may be determined as Type II touch operation.

In a preferred embodiment, Type I touch operation may be a short press and Type II touch operation may be a long press. Determining whether the time of a touch operation satisfies the preset conditions of Type I touch operation may include determining whether the time of the touch operation is greater than a preset first threshold value.

In a preferred embodiment, to unfold the two or more single-function buttons one after another around the multifunction button according to the type of a touch operation may include steps of: unfolding the two or more single-function buttons one after another in a user touch area around the multifunction button when the touch operation is Type I touch operation; and when the touch operation is Type II touch operation, adjusting the docking location of the multifunction button according to the movement operation of the multifunction button by the user, and unfolding the two or more single-function buttons one after another in the user touch area around the docking location of the multifunction button after the multifunction button moves and/or has been moved.

In a preferred embodiment, unfolding the two or more single-function buttons one after another in the user touch area around the multifunction button may include: unfolding the two or more single-function buttons evenly into an arc according to a preset radius around the multifunction button, wherein the distances of any two neighboring single-function buttons of the two or more single-function buttons are equal and the distances from any of the two or more single-function buttons to the multifunction button are equal.

In a preferred embodiment, adjusting the docking location of the multifunction button according to the movement operation of the multifunction button by the user may include: monitoring whether the user has moved the multifunction button; if the user has moved the multifunction button, obtaining the moved location of the multifunction button after the user stops the movement operation; and when the user stops the touch operation, determining the docking location of the multifunction button according to the area of the user interface to where the multifunction button has been moved.

A preferred embodiment of the present application may also include: dividing the movable area of the multifunction button on the user interface into three equal subareas, wherein the movable area is located on the bottom of the touchscreen device and its height is the horizontal area of a preset second threshold value; determining center coordinates of the three subareas;

Obtaining the moved location of the multifunction button after it is moved may include: detecting whether the current multifunction button is out of the movable area in a vertical direction during its movement. If it is, correcting the vertical coordinate of the location of the multifunction button after it is moved to the second threshold value of the movable area. The horizontal coordinate of the moved location may remain the same.

Determining the docking location of the multifunction button according to the area of the moved location on the user interface may include: determining the docking location of the multifunction button as the center coordinate of the current subarea where the moved location is located.

In a preferred embodiment, unfolding the two or more single-function buttons one after another in the user touch area around the docking location of the multifunction button after the multifunction button is moved may include: in the user touch area around the docking location of the multifunction button, unfolding evenly the two or more single-function buttons into an arc according to a preset radius around the multifunction button, wherein the distances of any two neighboring single-function buttons of the two or more single-function buttons are equal and the distances from any of the two or more single-function buttons to the multifunction button are equal.

In a preferred embodiment, the multifunction button is a semitransparent button.

According to an preferred embodiment of the present application, a user interface interactive method for touchscreen devices which combines two or more single-function buttons on the user interface of the touchscreen device may include: monitoring a real-time screen-touch operation with the multifunction button by a user; determining a type of the touch operation according to the time of the touch operation; and judging whether the type of the touch operation satisfies preset conditions to move the multifunction button. If the touch operation satisfies the preset conditions, determine the docking location of the multifunction button according to the movement operation of the multifunction button by the user; if not, unfold the two or more single-function buttons one after another around the multifunction button.

A user interface interactive device for touchscreen devices may include a combination module, which may be used to combine two or more single-function buttons on the user interface of the touchscreen device into one multifunction button; a monitoring module, which may be used to monitor the real-time touch operation with the multifunction button by the user; a first determination module, which may be used to determine the type of the touch operation according to the time of the touch operation; and an interaction module, which may be used to unfold the two or more single-function buttons one after another around the multifunction button according to the type of the touch operation.

In a preferred embodiment, the type of the touch operation includes Type I touch operation and Type II touch operation, and the first determination module comprises particularly: a first judgment submodule, which may be used to judge whether the time of the touch operation satisfies the preset conditions of Type I touch operation; a first determination submodule, which may be used to determine the type of the touch operation as the Type I touch operation when the result of the judgment submodule is yes; and a second determination submodule, which may be used to determine the type of the touch operation as the Type II touch operation when the result of the judgment submodule is no.

In a preferred embodiment, the Type I touch operation may be a short press and the Type II touch operation may be a long press. The Type I judgment submodule may be configured to judge whether the time of the touch operation is greater than the preset first threshold value.

In a preferred embodiment, the interaction module may include a first interaction submodule, an adjustment submodule, and a second interaction submodule, wherein, when the touch operation is Type I touch operation, the first interaction submodule may be used to unfold the two or more single-function buttons one after another in the user touch area around the multifunction button; when the touch operation is Type II touch operation, the adjustment submodule may be used to adjust the docking location of the multifunction button according to the movement operation of the multifunction button by the user; and the second interaction submodule may be used to unfold the two or more single-function buttons one after another in the user touch area around the docking location of the multifunction button after it is moved.

In a preferred embodiment, the first interaction submodule may be configured to unfold evenly the two or more single-function buttons into an arc around the multifunction button according to the preset radius, wherein the distances of any two neighboring single-function buttons of the two or more single-function buttons are equal and the distances from any of the two or more single-function buttons to the multifunction button are equal.

In a preferred embodiment, the adjustment submodule may include a monitoring submodule and obtaining submodule. The adjustment submodule may be used to monitor whether the user has moved the multifunction button. When the result of the monitoring submodule is yes, the obtaining submodule may obtain a moved location of the multifunction button after it is moved when the user stops the movement operation.

The interaction module may also include a third determination submodule, which may be used to determine the docking location of the multifunction button according to the area of the move location on the user interface when the user stops the movement operation.

In a preferred embodiment, adjustment submodule may also include a trisection module, which may be used to divide the movable area of the multifunction button on the user interface into three equal subareas, wherein the movable area may be located on the bottom of the touchscreen device and its height may be the horizontal area of the preset second threshold value.

The adjustment submodule may also include a second determination module, which may be used to determine the center coordinate points of the three subareas.

Accordingly, the obtaining the submodule may include a detection submodule, which may be used to detect whether the current multifunction button is out of the movable area in the vertical direction during its movement; and a correction submodule, which may be used to correct the vertical coordinate of the move location of the multifunction button after it is moved, to the second threshold value of the movable area, while the horizontal coordinate of the move location is the same as that of the location after it is moved.

Accordingly, the third determination submodule may be configured to determine the docking location of the multifunction button as the center coordinate point of the current subarea according to the current subarea where the move location is located.

In a preferred embodiment, the second interaction submodule may be configured to unfold evenly the two or more single-function buttons into an arc according to the preset radius in the user touch area around the docking location of the multifunction button, wherein the distances of any two neighboring single-function buttons of the two or more single-function buttons may be equal and the distances from any of the two or more single-function buttons to the multifunction button may be equal.

According to a preferred embodiment of the present application, a user interface interactive device for a touchscreen device may include a combination module, which may be used to combine two or more single-function buttons on the user interface of the touchscreen device into one multifunction button; a monitoring module, which may be used to monitor the real-time touch operation with the multifunction button by the user; a first determination module, which may be used to determine the type of the touch operation according to the time of the touch operation; a judgment module, which may be used to judge whether the type of the touch operation satisfies the preset conditions to move the multifunction button; a second determination module, which may be used to determine the docking location of the multifunction button according to the movement operation of the multifunction button by the user when the result of the judgment module is yes; and an unfolding module, which may be used to unfold the two or more single-function buttons one after another around the multifunction button when the result of the judgment module is no.

According to a preferred embodiment of the present application, a touchscreen device, which may include any of the devices as described above.

By combining several single-function buttons into one multifunction button, users may not need to consider the location of every single-function button in the current technology during the operation, instead, they may only need to operate with the multifunction button. In addition, as the combined single-function buttons are around the multifunction button, users may also control the screen of the single-function buttons they need to operate with by moving the multifunction button, which makes it convenient for users to use the single-function buttons on the touchscreen. Furthermore, with convenient operation, it will not increase the operation times on the touchscreen and thus will reduce the wear of the touchscreen of the touchscreen devices from users' operation.

BRIEF DESCRIPTION OF THE DRAWINGS

The embodiments described below may be more fully understood by reading the following description in conjunction with the drawings, in which.

DETAILED DESCRIPTION

Figure 1:
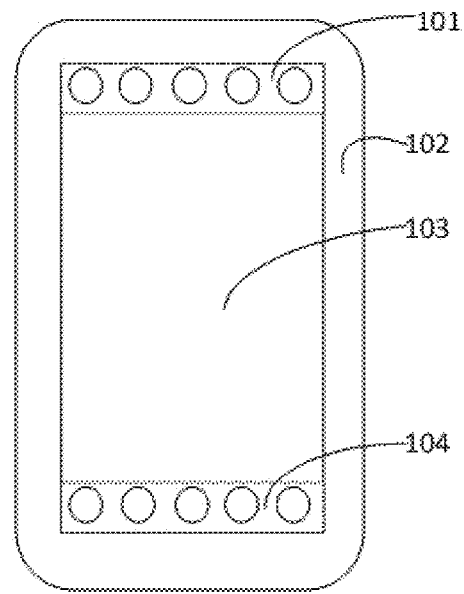
FIG. 1 is a schematic diagram of the user interface of a touchscreen device.
Figure 2:
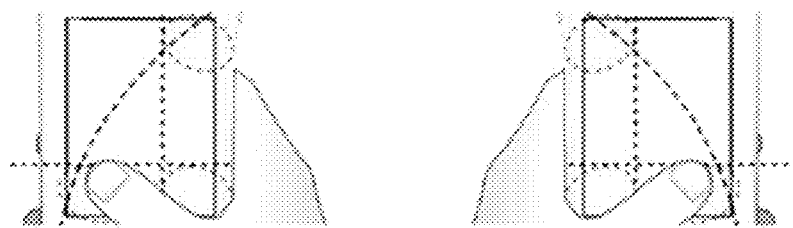
FIG. 2 is a schematic diagram of a user operation area of the touchscreen device.

Preferred embodiments will now be described more fully with reference to the accompanying drawings, in which preferred embodiments are shown. Preferred embodiments may, however, be embodied in many different forms and should not be construed as being limited to the preferred embodiments set forth herein; rather, preferred embodiments are provided so that this disclosure will be thorough and complete, and will fully convey the concept of the invention to one skilled in the art. In the drawings, the regions are exaggerated for clarity and not necessarily in scale. Like reference numerals in the drawings denote like elements, and thus, their description will not be repeated.

The present application is directed to user interface interactive methods and devices for touchscreen devices. Each of the touchscreen devices may include a non-transitory computer-readable and/or processor-readable storage medium and a processor in communication with the non-transitory computer-readable and/or processor-readable storage medium. The non-transitory computer-readable and/or processor-readable storage medium may store sets of instructions for conducting operations on a touchscreen. The processor may be configured to execute the sets of instructions, which conduct the user interface interactive methods. Here, the computer may be any type of electrical computational device, such as a laptop, a desktop, a tablet, a mobile phone (e.g., a featured cell phone and a smartphone), and/or a personal digital assistance (PDA), etc. the computer may also be the electrical computation part of any other device, such as the electrical computation part of a camera, a GPS device, and/or a motor vehicle, etc. In an even broader sense, the term computer used here may be any electrical designs that is capable of operating programs and processing data by a processor.

According to the methods, the processor may combine two or more single-function buttons on the user interface of the touchscreen device into one multifunction button and unfold the two or more single-function buttons around the multifunction button when a user touches the multifunction button. Because there may be only one multifunction button and its location may be fixed and all buttons may be unfolded around the multifunction button on the bottom of the touchscreen device, it is convenient for the user to operate the touchscreen device.

In the embodiments of the present application, for convenience of description, a touchscreen cellphone is adopted to illustrate the present application. However, the embodiments of the present invention may also be applied to other touchscreen devices like tablet PCs.

Figure 3:
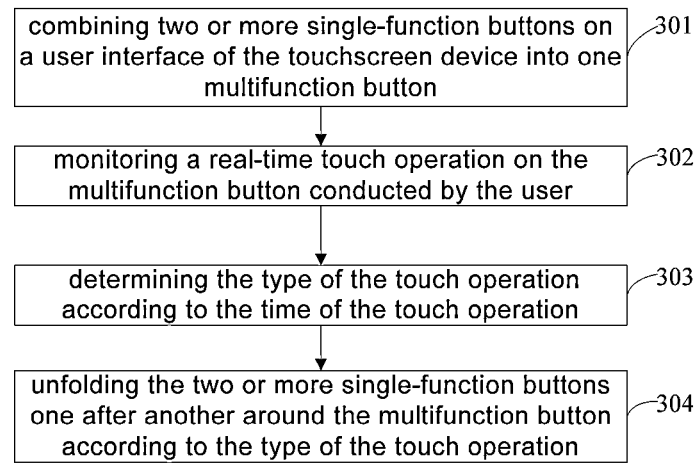
FIG. 3 is a flow diagram of an embodiment 1 of a first method of a preferred embodiment of the present invention.

FIG. 3 shows a flow diagram of embodiment 1 of the first user interface interactive method for touchscreen devices of the present application. The method may include using a processor to execute sets of instructions saved in a non-transitory computer-readable medium to conduct the following steps:

Step 301: combining two or more single-function buttons on a user interface of the touchscreen device into one multifunction button.

Figure 4:
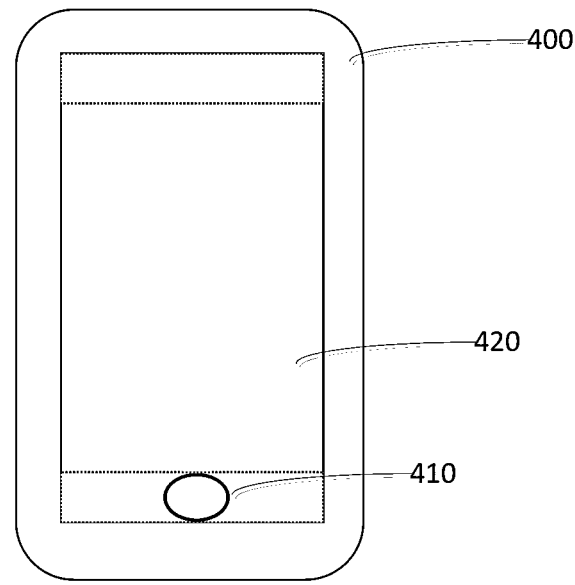
FIG. 4 is a schematic diagram of a location of the multifunction button in embodiment 1 of the first method of the present invention.

When implementing the embodiment of the present invention, the processor may first combine several single-function buttons on the user interface of the touchscreen device into one multifunction button. For example, the processor may combine several single-function buttons on the top or bottom of the touchscreen device into one multifunction button. A default location of the multifunction button may be preset at the central bottom location of the touchscreen device. FIG. 4 is a schematic diagram showing that a default location of the multifunction button 410 may be preset at the central bottom of a touchscreen 420 of a device 400.

Step 302: monitoring a real-time touch operation on the multifunction button conducted by the user.

In this step, the processor may monitor in real time whether the user has conducted and/or is conducting a touch operation with the multifunction button. If yes, the processor may start a timer to detect the time of the touch operation on the multifunction button conducted by the user.

Step 303: determining the type of the touch operation according to the time of the touch operation.

In practical use, a user may conduct long-press, short-press or double-click the multifunction button. Therefore, there may be several types of touch operation in this step. For example, Type I touch operation may be defined as short press, Type II touch operation may be defined as long press, Type III touch operation may be defined as double click, and Type IV touch operation may be defined as another type of touch operation and so on. Because in practical use common operations are mainly long press and short press, example embodiments in the present application only distinguish two types of touch operation: Type I touch operation and Type II touch operation. However, the spirit of the example embodiments should also be applied to situations that include more than two types of touch operations.

Figure 5:
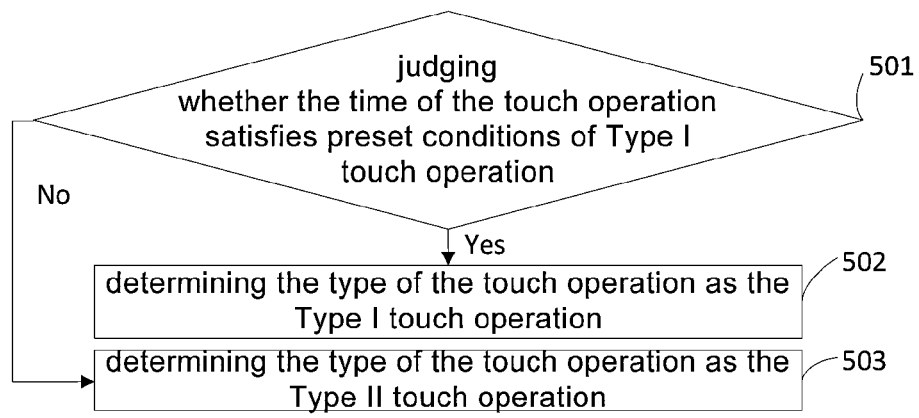
FIG. 5 is a flow diagram of step 302 in embodiment 1 of the first method of the present invention.

As shown in FIG. 5, conducting step 303 may require the processor conduct the following steps:

Step 501: judging whether the time of the touch operation satisfies preset conditions of Type I touch operation. If it does, the processor may proceed to step 502; if not, the processor may proceed to step 503. The preset conditions may be set according to whether Type I touch operation is defined as a long press or a short press. For example, if Type I touch operation is defined as a short press, the preset conditions may be set as short press time.

Step 502: determining the type of the touch operation as the Type I touch operation. If the time of the touch operation satisfies the time requirements of Type I touch operation, the processor may determine the type of the touch operation as Type I touch operation.

Step 503: determining the type of the touch operation as the Type II touch operation. If the time of the touch operation fails the time requirements of Type I touch operation, the processor may determine the type of the touch operation as Type II touch operation. This example is only represented when there are two touch operation types. In situations where there are more than two types of touch operation, those skilled in the art may make corresponding adjustment and/or amend the steps above accordingly in order to distinguish all types of touch operation.

Figure 6:
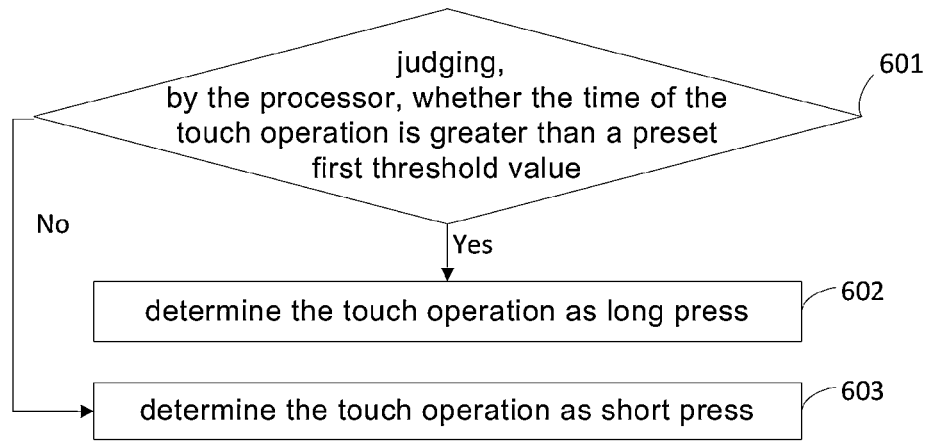
FIG. 6 is an instance flow diagram of step 302 in embodiment 1 of the first method of the present invention.

To make those skilled in the art understand the implementation of the present application, illustrations are made below based on the situation that Type I touch operation is short press and the Type II touch operation is long press. Accordingly, the step 302 may include the following steps as shown in FIG. 6:

Step 601: judging, by the processor, whether the time of the touch operation is greater than a preset first threshold value. If it does, the processor may proceed to step 602; if not, the processor may proceed to step 603.

The preset first threshold value may be determined before step 601 and servers as a critical point to distinguish a long press touch from a short press touch. For example, the preset first threshold value may be 0.8 second (0.8 s). When implementing step 602, the touch operation time may be obtained by monitoring a touchesBegan event (i.e., the beginning of a touch operation) and a touchesEnded event (i.e., the end of the touch operation) of the UIView (i.e., the user interface). A timer may be started by the processor when the touchesBegan event is triggered and stopped by the processor when the touchesEnded event is triggered, and the operation time on the timer is the touch operation time.

Step 602: determine the touch operation as long press. When the touch operation time is longer than the preset first threshold value (e.g., 0.8 s), the type of the touch operation by the user may be determined as long press.

Step 603: determine the touch operation as short press. When the touch operation time is shorter than the preset first threshold value (e.g., 0.8 s), the type of the touch operation by the user may be determined as short press.

It should be noted that when the touch operation time equals the preset first threshold value (e.g., 0.8 s), the type of the touch operation may be determined as long press or short press according to the actual situation which may be set by the user.

Step 304: unfolding the two or more single-function buttons one after another around the multifunction button according to the type of the touch operation.

In this step, the processor may unfold the two or more single-function buttons one after another around the multifunction button according to the type of the touch operation. The unfolding way may differ as the touch operation type changes. For example, when the touch operation is Type I touch operation, the processor may unfold the two or more single-function buttons one after another in a user touch area around the multifunction button directly; when the touch operation is Type II touch operation, the processor may first adjust a docking location (i.e., an actual location that a button is finally placed by the processor after a user moves the button from its original location on the touchscreen) of the multifunction button according to the movement operation of the multifunction button by the user. Then the processor may unfold the two or more single-function buttons one after another in the user touch area around the docking location of the multifunction button after it is moved.

It should be understood that there are such examples in practical use as that when the user short-presses the multifunction button (that is, when Type I touch operation is short press), the processor may unfold the combined single-function buttons one after another around the multifunction button into an arc; and when the user long-presses the multifunction button (that is, when Type II touch operation is long press), the processor may monitor if the multifunction button is moved by the user from its original location, place the multifunction button to a docking location after it is moved by the user, and unfold the combined single-function buttons one after another around the docking location of the multifunction button. These actions may be conducted by the processor simultaneously or may be conduct by the processor one after another. The situation on user's long-pressing the multifunction button will be introduced in detail in embodiment 2 and embodiment 3.

It should be noted that, according to the user's using habits or aesthetic measure, when short-pressing the multifunction button, the user may decide that the processor unfolds evenly the two or more single-function buttons into an arc according to a preset radius around the multifunction button, wherein the distances of any two neighboring single-function buttons of the two or more single-function buttons are equal and the distances from any of the two or more single-function buttons to the multifunction button are equal.

Figure 7:
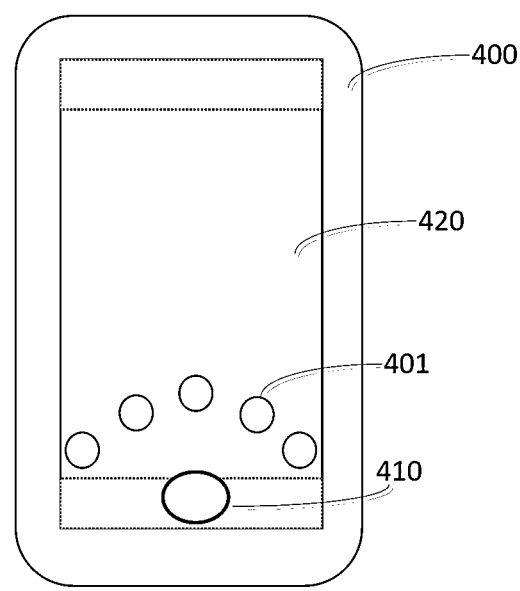
FIG. 7 is a schematic diagram of the interface when an embodiment of the present invention unfolds several single-function buttons on the user interface.

FIG. 7 is a schematic diagram of the interface when several single-function buttons are unfolded in the user interface, wherein FIG. 7 illustrates 5 single-function buttons, and the distances of any two neighboring single-function buttons 401 are equal and the distances from any of single-function buttons 401 to the multifunction button 410 are equal. It should be noted that FIG. 7 is just an example embodiment of the even unfolding of single-function buttons. The single-function buttons may also be unfolded at will around the multifunction button without limiting the distribution of the single-function buttons as long as the user can see these single-function buttons.

In this example embodiment, the unfolding diameter of the single-function buttons may be ½ to ⅔ of the diameter of the multifunction button, while the user may decide the size of the single-function buttons or multifunction button. This example embodiment is just an illustration. In addition, the number of the single-function buttons and that whether there will be background or words when the single-function buttons are unfolded and so on may be defined by the user himself. It should be noted that when the number of unfolded single-function buttons is more than a maximum number that is allowed to be displayed on the screen of the touchscreen device, the number of unfolded single-function buttons may be set according to the current location of the multifunction button. For example, when the multifunction button is on the left or right side, the number of single-function buttons may be no more than 6. When the number of single-function buttons exceeds 6, only 5 of the single-function buttons may be displayed and the last button (i.e., the 6th button displayed) may be a "Show More" button. When the user touches the "Show More" button, an action sheet and/or a menu may pop up for the user to choose from more actions provided thereon. When the multifunction button is on the bottom middle of the screen, the number of the buttons may be no more than 11 and when the number of single-function buttons exceeds 11, only 10 single-function buttons are displayed. The last button (i.e., the 10th button displayed) may be a "Show More" button. When the user touches the "Show More" button, an action sheet and/or a menu may pop up for the user to choose from more actions provided thereon.

It should be understood that, in practical use, user may also set the multifunction button as a semitransparent button, which may not affect the screen display frame of the touchscreen device and may also achieve the effect of the example embodiment of the present application.

In the example embodiment, after combining several single-function buttons into one multifunction button with the method above, users may not need to consider the location of every single-function button during the operation, instead, they may only need to operate with the multifunction button. In addition, as the combined single-function buttons are around the multifunction button, users may also control the screen of the single-function buttons they need to operate with by moving the multifunction button, which makes it convenient for users to use the single-function buttons on the touchscreen. Furthermore, with convenient operation, it will not increase the operation times on the touchscreen and thus may reduce the wear of the touchscreen of the touchscreen devices from users' operation.

Figure 8:
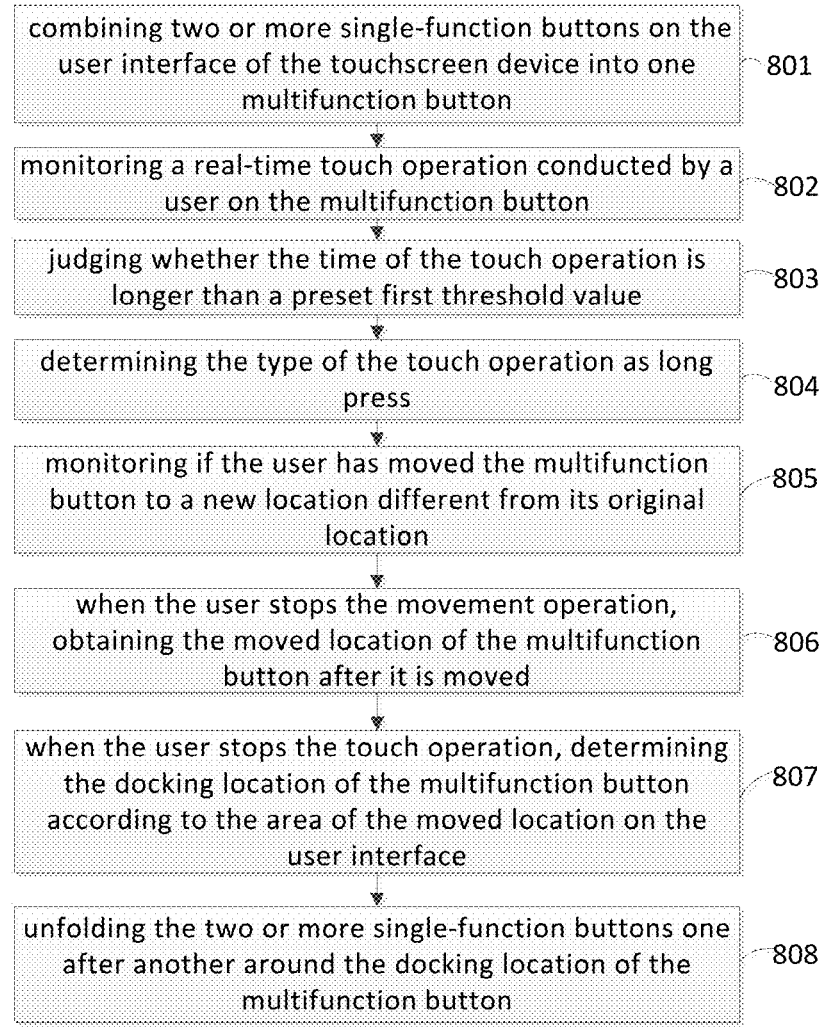
FIG. 8 is a flow diagram of an embodiment 2 of the first method of the present invention.

FIG. 8 illustrates a flow chart of an embodiment 2 of the first user interface interactive method for touchscreen devices of the present invention. In this embodiment, the touch operation type may include Type I and Type II touch operation, wherein Type II touch operation is illustrated as long press and Type I touch operation is illustrated as short press. In this example embodiment (i.e., embodiment 2), the processor may execute sets of instructions stored in the non-transitory computer-readable medium to conduct the following steps:

Step 801: combining two or more single-function buttons on the user interface of the touchscreen device into one multifunction button.

Step 802: monitoring a real-time touch operation conducted by a user on the multifunction button.

The implementation of step 801 and step 802 is similar to step 301 and step 302, respectively, in embodiment 1, as shown in FIG. 3.

Step 803: judging whether the time of the touch operation is longer than a preset first threshold value. If it is, the processor may determine that the touch operation type is long press.

Step 804: determining the type of the touch operation as long press.

After determining the type of the touch operation is long press, the processor may adjust the docking location of the multifunction button according to the movement operation of the multifunction button by the user, wherein step 805 to step 807 illustrate how to adjust the docking location of the multifunction button according to the movement operation of the multifunction button by the user.

Step 805: monitoring if the user has moved the multifunction button to a new location different from its original location. If he does, the processor may proceed to step 806.

In this step, the processor may also monitor whether the user moves the multifunction button when he long-presses the multifunction button. If he does, the location of the multifunction button is changed.

Step 806: when the user stops the movement operation, obtaining the moved location of the multifunction button after it is moved.

In this step, the processor may obtain the current moved location of the multifunction button when the user stops the movement operation. Because the user may move the multifunction button at will on the whole screen of the touchscreen device, the processor may monitor the current location of the multifunction button after the user has stopped the movement operation.

Step 807: when the user stops the touch operation, determining the docking location of the multifunction button according to the area of the moved location on the user interface.

If the user stops touching the multifunction button after stops moving the multifunction button, the processor may determine the docking location of the multifunction button according to its moved location as determined in step 806. For example, when the user stops dragging the multifunction button, the multifunction button may or may not just stop right in its docking location. Thus the processor may determine whether the multifunction button needs to dock on the left, middle, or right side of the user interface according to the area where its moved location is, for example, on the left, middle or right side of the user interface.

Step 808: unfolding the two or more single-function buttons one after another around the docking location of the multifunction button.

After the docking location of the multifunction button is determined, the two or more single-function buttons may be unfolded one after another around the docking location of the multifunction button. For example, the processor may unfold evenly the two or more single-function buttons into an arc according to the preset radius around the multifunction button, wherein the distances of any two neighboring single-function buttons of the two or more single-function buttons may be equal and the distances from any of the two or more single-function buttons to the multifunction button may be equal.

Figure 9:
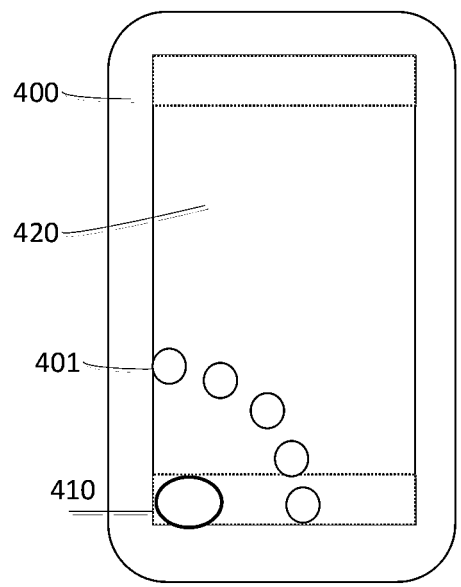
FIGS. 9 and 10 are schematic diagrams of unfolding single-function buttons when a docking location of the multifunction button is on the left and right side of the user interface.
Figure 10:
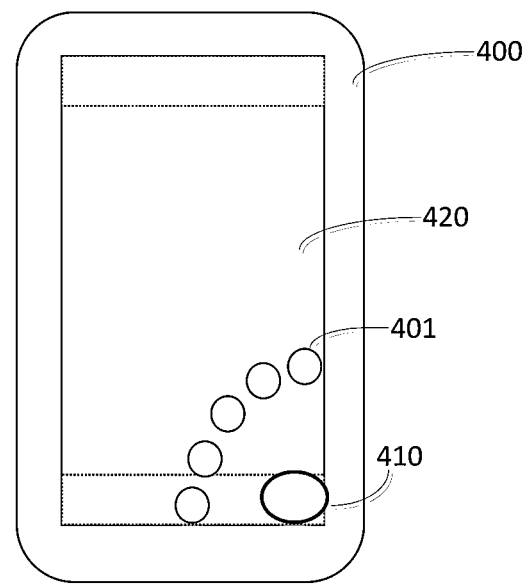

FIG. 9 is a schematic diagram showing unfolding single-function buttons when the docking location of the multifunction button is on the left side of the user interface. FIG. 10 is a schematic diagram showing unfolding single-function buttons when the docking location of the multifunction button is on the right side of the user interface. It can be seen from FIGS. 9-10 that after unfolding the single-function buttons, the single-function buttons are distributed evenly on an arc with the multifunction button as the center of the arc. The diameter of the arc is ½ of the screen height of the touchscreen device. When the multifunction button is on the left or right bottom of the screen, the single-function buttons form a 90-degree arc, and when the multifunction button is in the middle of the screen, the single-function buttons form a 180-degree arc. It should be noted that the diameter of the arc formed by unfolding single-function buttons may also be ⅓ of the screen height of the touchscreen device, or other numerical value, or a diameter preset by the user.

It should be noted that, the multifunction button may be at any location on the screen of the touchscreen device and the single-function buttons may be unfolded in various ways such as being unfolded vertically or horizontally. The schematic diagrams in the example embodiment of the present application are only examples and should not be understood as all of the implementation models of the embodiment of the present application.

In this embodiment, the user can move the multifunction button to the left, middle or right bottom of the screen by long-pressing the multifunction button so he can unfold the single-function buttons in a range convenient for his operation, which not only increases the utilization rate of the screen of the touchscreen device but also enhances user experience.

Figure 11:
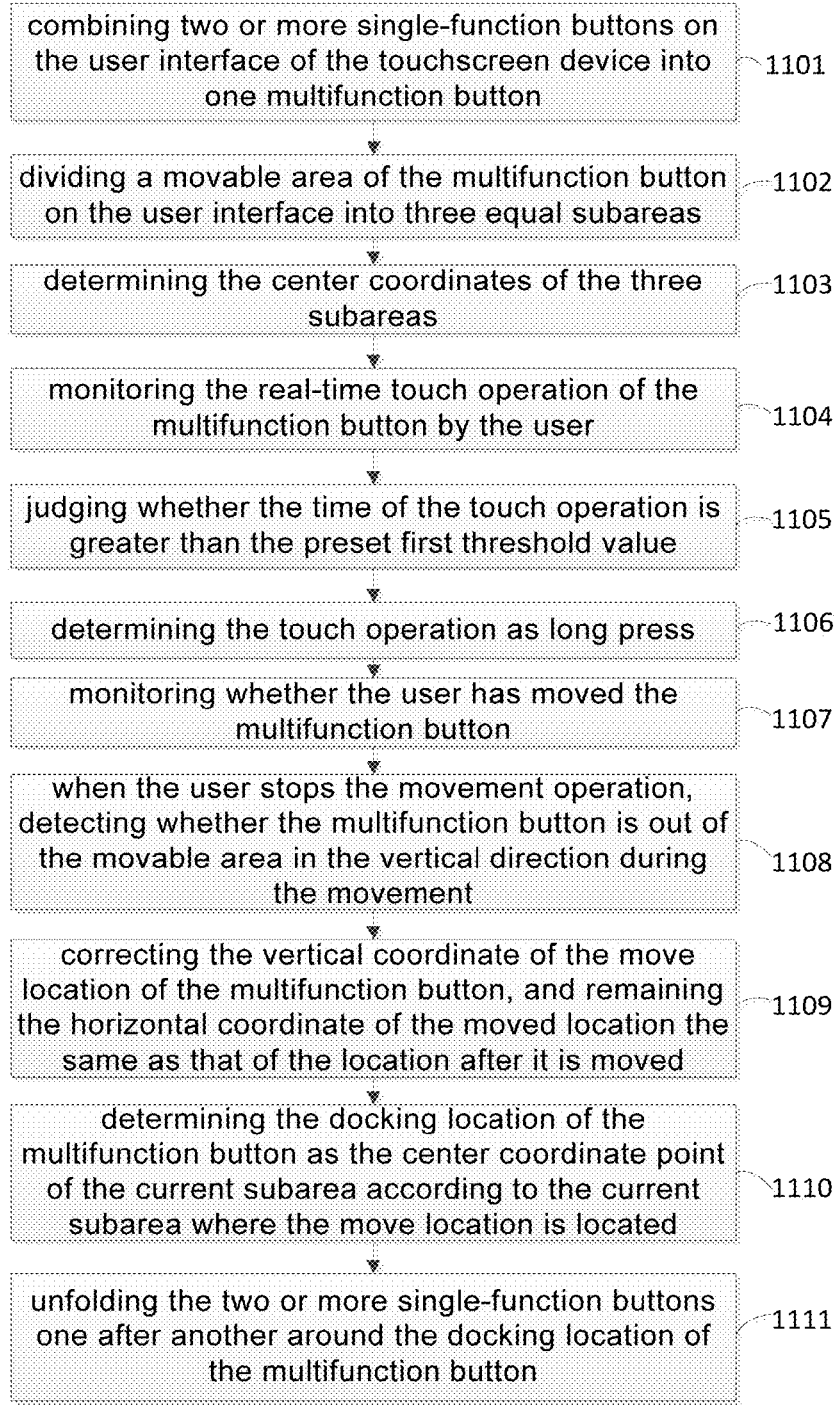
FIG. 11 is a flow diagram of an embodiment 3 of the first method of the present invention.

FIG. 11 shows a flow diagram of an embodiment 3 of the first user interface interactive method for touchscreen devices of the present application. In this example embodiment, touch operation type may include Type I touch operation and Type II touch operation, wherein Type II touch operation may be illustrated as long press and Type I touch operation may be illustrated as short press. The embodiment may require the processor execute sets of instructions stored in the non-transitory computer-readable medium to conduct the following steps:

Step 1101: combining two or more single-function buttons on the user interface of the touchscreen device into one multifunction button.

Step 1102: dividing a movable area (i.e., an area on the touchscreen on which the multifunction button may be movable) of the multifunction button on the user interface into three equal subareas; wherein the movable area may be a horizontal area located on the bottom of the touchscreen of the device. The movable area may have a height equals a preset second threshold value.

The second threshold value may be modified according to the size of the multifunction button and may be generally fixed on the bottom of the touchscreen of the touchscreen device, for example, within the area with a height of 44 pixels above the bottom of the screen and a width of the screen bottom horizontal line, which is called the movable area of the multifunction button. The processor may divide the movable area into three equal subareas A (left side), B (middle) and C (right side).

Step 1103: determining the center coordinates of the three subareas.

The processor may set the center coordinates of the three subareas as the final docking locations of the multifunction function button in the three subareas—a (center coordinate of subarea A), b (center coordinate of subarea B) and c (center coordinate of subarea C).

Step 1104: monitoring the real-time touch operation of the multifunction button by the user.

Step 1105: judging whether the time of the touch operation is greater than the preset first threshold value.

Step 1106: determining the touch operation as long press.

Step 1107: monitoring whether the user has moved the multifunction button. If he does, the processor may proceed to step 1108.

Step 1108: when the user stops the movement operation, detecting whether the multifunction button is out of the movable area in the vertical direction during the movement. If it is, the processor may proceed to step 1109.

Because the user may move the multifunction button at will, the processor may detect whether the multifunction button is out of the movable area in the vertical direction after the user stops moving the multifunction button. If yes, the processor may automatically correct the location of the multifunction button later.

Step 1109: correcting the vertical coordinate of the move location of the multifunction button after it is moved to the second threshold value of the movable area, and remaining the horizontal coordinate of the moved location the same as that of the location after it is moved.

Because the location of the multifunction button will not just stop at a, b or c when the user stops dragging the multifunction button, the processor may check which area of A, B or C the coordinate of the multifunction button is in, and its final docking point may be determined as the center coordinate point of the current area. When the coordinate of the multifunction button is not out of the movable area, the center coordinate of the multifunction button may be the coordinate of the multifunction button in its current move location; when the coordinate of the multifunction button is out of the movable area, the X value (i.e., the value of the horizontal coordinate) in the horizontal direction of the center coordinate of the multifunction button may be kept the same as the X value of the current move location, but the Y value (i.e., the value of the vertical coordinate) in the vertical direction may be the Y value that the move location of the multifunction button maps on the upper boundary of the movable area. Accordingly, the processor may automatically correct the deviation that the multifunction button exceeds its movable range when the user long-presses and moves the multifunction button, which means that, when the multifunction button moves on the bottom of the touchscreen device, the move direction depends on the move direction of the multifunction button on the horizontal line, while the move distance on the straight-line distance of the multifunction button in the horizontal direction.

It should be noted that, the horizontal and vertical directions specified in the embodiment of the present invention are relative directions with the bottom horizontal line when the touchscreen device is placed in forward direction.

Step 1110: determining the docking location of the multifunction button as the center coordinate point of the current subarea according to the current subarea where the move location is located.

For example, if the current subarea where the move location of the multifunction button is located is subarea A, the docking location of the multifunction button may be determined as point a.

Step 1111: unfolding the two or more single-function buttons one after another around the docking location of the multifunction button.

It should be noted that, when unfolding the single-function buttons in this step, three corresponding animations may be set according to the docking location of the multifunction button and each may include the movement of the locations of the single-function buttons and the rotation of the angle of the single-function buttons as well as the dissolving effect of the single-function buttons. Each single-function button may correspond to an animation path from its starting location to its ending location, and the animation path may be accompanied by the spinning effect of the single-function button. A simple animation may also be used to present the process that the multifunction button moves from the move location to the docking location. The duration may be limited to 0.2 s. It should be understood that, during the animation playing process, the multifunction button may not respond to touch operation conducted by the user anymore and may only respond to the touch operation after the animation is ended.

It should be noted that, the unfolded single-function button may have both a starting location and an ending location when the multifunction button is in different positions. The starting location of each single-function button may be fixed, which may be the center coordinate of the multifunction button, while the ending location should be referred to the arc arrangement specified above. The animation of the single-function buttons may be the combination of the animation of each single-function button from its starting location to its ending location. The animation mainly may include two parts: one is the movement of the location and the other is the spinning of the single-function button itself. The time of the animation may be set as being equally split, i.e., the content of the animation may be equally distributed according to the time. For example, the spinning starts when the single-function button is moved to the starting location and ends when it arrives the ending point. The animation of the single-function button may also be set as the animation style that supports customized definition, in which, user only needs to define an AnimationGroup object in IOS.

It should be understood that the play time of the animation of single-function buttons may be set as 0.5 s, and the interval of the animal starting time of each single-function button may be 0.1 s, which may ensure that the complete animation of tall single-function buttons be ended in 1 s. So it will not affect user experience and also makes it convenient for user operation.

The numerical values in the embodiment of the present invention are examples made for easy understanding by those skilled in the art. Those skilled in the art may choose other numerical values by themselves without contributing any creative labor.

Figure 12:
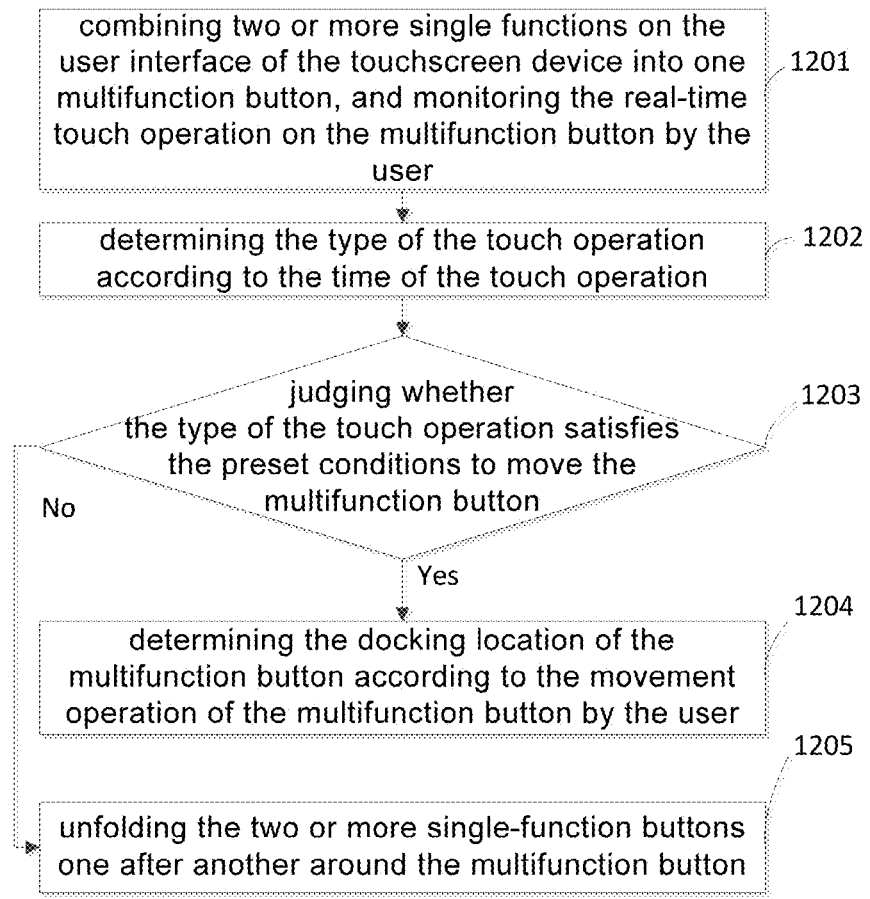
FIG. 12 is a schematic diagram of an embodiment of the second method of the present invention.

A second user interface interactive method for touchscreen devices may also be provided in the embodiment of the present application, as shown in FIG. 12. This embodiment may require the processor execute sets of instructions stored in the non-transitory computer-readable medium to conduct the following steps:

Step 1201: combining two or more single functions on the user interface of the touchscreen device into one multifunction button, and monitoring the real-time touch operation on the multifunction button by the user.

Step 1202: determining the type of the touch operation according to the time of the touch operation.

In this embodiment, the implementation of step 1201 and step 1202 may be referred to embodiment 1, embodiment 2, and embodiment 3 of the first user interface interactive method for touchscreen devices as described above.

Step 1203: judging whether the type of the touch operation satisfies the preset conditions to move the multifunction button. If it does, the processor may proceed to step 1204; if not, the processor may proceed to step 1205.

In this step, the difference from the first user interface interactive method for touchscreen devices may be judging whether the type of the touch operation satisfies the preset conditions to move the multifunction button. For example, when the type of the touch operation is long press, it is deemed that it satisfies the preset conditions to move the multifunction button. However, those skilled in the art and/or a user may change the preset conditions according to the actual scene. For example, it may be set as that, when the user double-clicks the multifunction button, it is deemed that it satisfies the preset conditions to move the multifunction button;

Step 1204: determining the docking location of the multifunction button according to the movement operation of the multifunction button by the user.

If it satisfies the preset conditions to move the multifunction button, the processor may determine the final docking location of the multifunction button according to the movement operation of the multifunction button by the user, wherein the solution on how to determine the docking location may be referred to embodiment 2 and embodiment 2 of the first user interface interactive method for touchscreen devices, as set forth above.

Step 1205: unfolding the two or more single-function buttons one after another around the multifunction button.

If it does not satisfy the preset conditions to move the multifunction button, the processor may unfold the two or more single-function buttons around the multifunction button directly. It should be noted that, the implementation of the steps in this embodiment may be referred to those in embodiment 1, embodiment 2, and embodiment 3 of the first user interface interactive method for touchscreen devices, so it is unnecessary to go into details here.

Through the description of the embodiments above, those skilled in the art may understand that the present application may be embodied in the form of a software and/or hardware product. The computer software product is stored in a computer-readable storage medium including a number of instructions that make a computer equipment (which can be a PC, a server, or network equipment and so on) implement all or part of the steps of the methods in the embodiments of the present application. While the storage medium may include, but not limited to, ROM, RAM, disk or optical disk or other medium that can store program codes.

Figure 13:
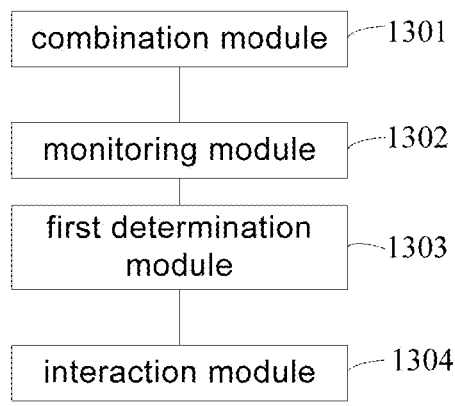
FIG. 13 is a structural schematic diagram of embodiment 1 of the first device of the present invention.
Figure 14:
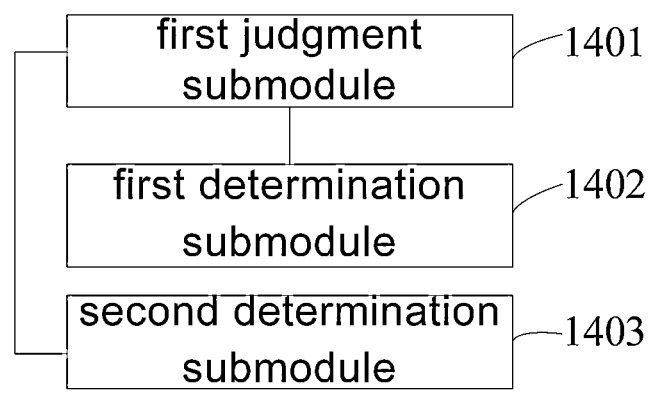
FIG. 14 is a structural schematic diagram of a first determination module 1103 in embodiment 1 of the first device of the present invention.

Corresponding to the method embodiment above, the embodiment of the present application also provides a first user interface interactive device for touchscreen devices. FIG. 13 shows a structural schematic diagram of an embodiment 1 of the first user interface interactive device for touchscreen devices, which may comprise:

a combination module 1301 being configured to combine two or more single-function buttons on the user interface of the touchscreen device into one multifunction button;

a monitoring module 1302 being configured to monitor the real-time touch operation of the multifunction button by the user; and a first determination module 1303 being configured to determine the type of the touch operation according to the time of the touch operation;

wherein the type of the touch operation may include Type I touch operation and Type II touch operation. As shown in FIG. 14, the first determination module 1303 may comprises:

a first judgment submodule 1401 being configured to judge whether the time of the touch operation satisfies the preset conditions of Type I touch operation;

Type I touch operation is short press and Type II touch operation is long press. The first judgment submodule may be configured to:

judge whether the time of the touch operation is longer than a preset first threshold value;

a first determination submodule 1402, which may be configured to determine the type of the touch operation as the Type I touch operation when the result of the judgment submodule is yes;

a second determination submodule 1403, which may be configured to determine the type of the touch operation as the Type II touch operation when the result of the judgment submodule is no;

an interaction module 1304, which may be configured to unfold the two or more single-function buttons one after another around the multifunction button according to the type of the touch operation.

Figure 15:
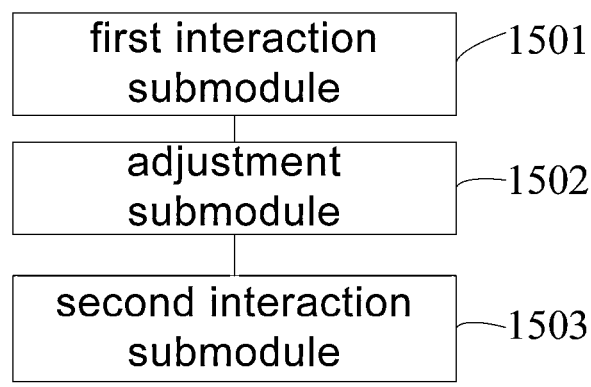
FIG. 15 is a structural schematic diagram of interaction module 1304 in embodiment 1 of the first device of the present invention.

As shown in FIG. 15, the interaction module 1304 may comprise a first interaction submodule 1501, an adjustment submodule 1502, and a second interaction submodule 1503, wherein when the touch operation is Type I touch operation, the first interaction submodule 1501 may be configured to unfold the two or more single-function buttons one after another in the user touch area around the multifunction button;

The first interaction submodule 1501 may be configured to unfold evenly the two or more single-function buttons into an arc according to the preset radius around the multifunction button, wherein the distances of any two neighboring single-function buttons of the two or more single-function buttons may be equal and the distances from any of the two or more single-function buttons to the multifunction button may be equal;

When the touch operation is Type II touch operation, the adjustment submodule 1502 may be configured to adjust the docking location of the multifunction button according to the movement operation of the multifunction button by the user; and The second interaction submodule 1503 may be configured to unfold the two or more single-function buttons one after another in the user touch area around the docking location of the multifunction button after it is moved.

In this embodiment, when operating the touchscreen device, users do not need to consider the location of every single-function button in the current technology during the operation, instead, they only need to operate with the multifunction button. In addition, as the combined single-function buttons are around the multifunction button, users may also control the screen of the single-function buttons they need to operate with by moving the multifunction button, which makes it convenient for users to use the single-function buttons on the touchscreen. Furthermore, with convenient operation, it will not increase the operation times on the touchscreen and thus will reduce the wear of the touchscreen of the touchscreen devices from users' operation.

Figure 16:
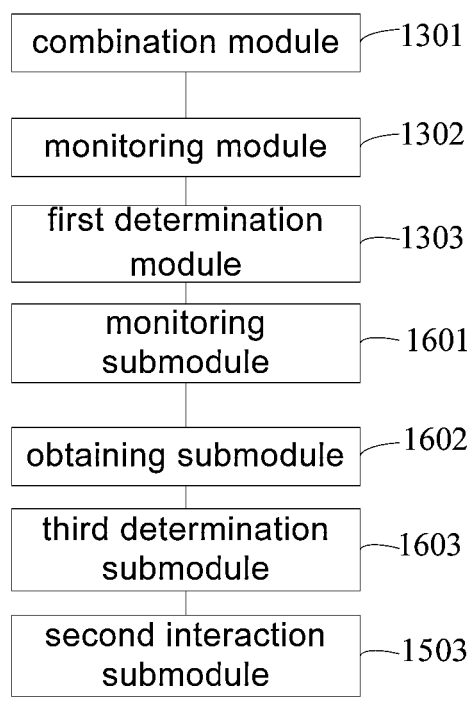
FIG. 16 is a structural schematic diagram of an embodiment 2 of the first device of the present invention.

FIG. 16 shows a structural schematic diagram of an embodiment 2 of the first user interface interactive device for touchscreen devices. The touch operation type may include Type I touch operation and Type II touch operation, wherein Type II touch operation may be illustrated as long press. The device in the embodiment may comprise:

a combination module 1301, which may be configured to combine two or more single-function buttons on the interface of the touchscreen device into one multifunction button;

a monitoring module 1302, which may be configured to monitor the real-time touch operation of the multifunction button by the user;

a first determination module 1303, which may be configured to determine the type of the touch operation according to the time of the touch operation.

When the touch operation is Type II touch operation, the adjustment submodule 1502 may comprise:

a monitoring submodule 1601, which may be configured to monitor whether the user has moved the multifunction button;

when the result of the monitoring submodule 1601 is yes, the obtaining submodule 1602, which may be used when the user stops the movement operation, may be configured to obtain the location of the multifunction button after it is moved;

a third determination submodule 1603, which may be configured to determine the docking location of the multifunction button according to the area of the move location on the user interface when the user stops the touch operation.

The second interaction submodule 1503 may be configured to unfold evenly the two or more single-function buttons into an arc according to the preset radius in the user touch area around the docking location of the multifunction button, wherein distances of any two neighboring single-function buttons of the two or more single-function buttons may be equal and the distances from any of the two or more single-function buttons to the multifunction button may be equal.

In this embodiment, the user may move the multifunction button to the left, middle or right bottom of the screen by long-pressing the multifunction button so he may unfold the single-function buttons in a range convenient for his operation, which not only increases the utilization rate of the screen of the touchscreen device but also enhances user experience.

Figure 17:
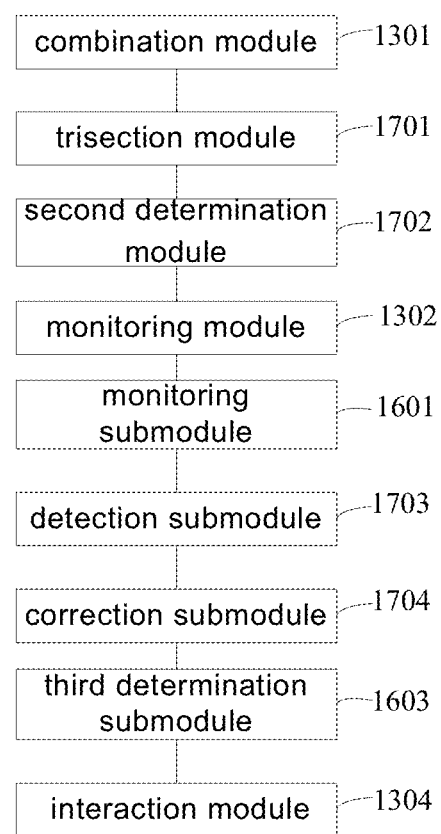
FIG. 17 is a structural schematic diagram of an embodiment 3 of the first device of the present invention.

FIG. 17 shows a structural schematic diagram of an embodiment 3 of the first user interface interactive device for touchscreen devices. The touch operation type may include Type I touch operation and Type II touch operation, wherein Type II touch operation may be illustrated as long press. The device in the embodiment may comprise:

a combination module 1301, which may be configured to combine two or more single-function buttons on the user interface of the touchscreen device into one multifunction button;

a trisection module 1701, which may be configured to divide the movable area of the multifunction button on the user interface into three equal subareas; wherein the movable area may be a horizontal area located on the bottom of the touchscreen device and its height may equals to the preset second threshold value;

a second determination module 1702, which is used to may be configured to determine the center coordinate points of the three subareas;

a monitoring module 1302, which may be configured to monitor the real-time touch operation of the multifunction button by the user.

a monitoring submodule 1601, which may be configured to monitor whether the user has moved the multifunction button;

when the result of the monitoring submodule 1601 is yes, in this embodiment, the obtaining submodule 1602 may comprise:

a detection submodule 1703, which may be configured to detect whether the current multifunction button is out of the movable area in the vertical direction during its movement;

a correction submodule 1704, which may be configured to correct the vertical coordinate of the move location of the multifunction button after it is moved, to the second threshold value of the movable area, while the horizontal coordinate of the move location is the same as that of the location after it is moved;

a third determination submodule 1603, which may be configured to determine the docking location of the multifunction button as the center coordinate point of the current subarea according to the current subarea where the move location is located; and an interaction module 1304, which may be configured to unfold the two or more single-function buttons one after another around the docking location of the multifunction button according to the type of the touch operation.

Figure 18:
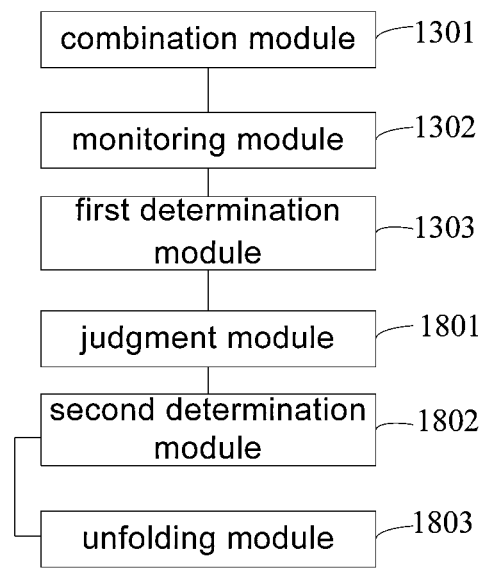
FIG. 18 is a structural schematic diagram of an embodiment of the second device of the present invention.

FIG. 18 shows a structural schematic diagram of an embodiment of the second user interface interactive device for touchscreen devices which may comprise:

a combination module 1301, which may be configured to combine two or more single-function buttons on the user interface of the touchscreen device into one multifunction button;

a monitoring module 1302, which may be configured to monitor the real-time touch operation of the multifunction button by the user;

a first determination module 1303, which may be configured to determine the type of the touch operation according to the time of the touch operation;

a judgment module 1801, which may be configured to judge whether the type of the touch operation satisfies the preset conditions to move the multifunction button;

a second determination module 1802, which may be configured to determine the docking location of the multifunction button according to the user's movement operation of the multifunction button when the result of the judgment module is yes; and an unfolding module 1803, which may be configured to unfold one after another the two or more single-function buttons around the multifunction button when the result of the judgment module is no.

It should be noted that the modules set forth above may be hardware structures in the touchscreen devices of the present application. The modules may also be hardware module embedded in the processor. The modules may also be instructions stored in the non-transitory computer-readable storage medium and may be executed by the processor.

To the device embodiment, as it is basically corresponding to the method embodiment, please refer to the description of the method embodiment for relevant steps. The device embodiment described above is just a schematic embodiment, wherein the units that are illustrated as separated parts may be or may not be separated physically, and the components displayed as units may be or may not be physical units, that is, they can be located in the same place or distributed in several network elements. Part or all of the modules may be selected to achieve the goal of the embodiment according to the actual demand. Those skilled in the art may understand and implement the embodiment without contributing any creative labor.

A touchscreen device is also disclosed in the embodiment of the present invention. The touchscreen device may be any one of the user interface interactive device disclosed above.

It should be understood that, the present invention can be used in many general or special-purpose computer system environments or configurations, such as PC, server computer, handheld device or portable device, tablet device, multiprocessor system, microprocessor-based system, set-top box, programmable consumer electronics, network PC, small-size computer, large-scale computer and the distributed computing environment that includes any of the systems or equipment above and so on.

The present invention can be described in the general context of the executable instruction executed by the computer, such as program module. Generally, program module includes routine, program, object, component and data structure and so on that execute specific tasks or realize specific abstract data types. The present invention can also be practiced in distributed computing environments. In those distributed computing environments, tasks are executed by remote process equipment connected through communication network. In distributed computing environments, program modules can be located in the local and remote computer storage mediums including storage devices.

It should be noted that, the relation terms like first and second, as used herein, are only used to distinguish one entity or operation from another and are not necessarily required to or indicating any actual such relation or order between those entities or operations. Moreover, the terms "include" "comprise" or any other variant means non-exclusive comprising, so comprising or including the processes, methods, objects or equipment of a series of elements means there are not only those elements included but also other elements that are not listed or means they also include the inherent elements of those processes, methods, objects or equipment. Without more restrictions, the elements limited by the phrase "including one . . . " does not rule out the possibility that there are other identical elements in the processes, methods, objects or equipment of the element.

The invention has been described in terms of various specific embodiments. It should be pointed out that those skilled in the art may make various changes and modifications on those embodiments without deviating from the principles of the present invention and those changes and modifications should be within the scope of protection of the present invention.

We claim:

1. A processor-implemented method for operating an interactive user interface on a touchscreen device comprising:

monitoring, by a processor of the touchscreen device, a real-time touch operation of the interactive user interface, by a user, wherein a portion of the interactive user interface defines a movable area, a docking location movable within the movable area, and a multifunction button located at the docking location;

determining, by the processor, a target type of the real-time touch operation from a plurality of different types of touch operations comprising a Type I touch operation and a Type II touch operation based on a duration of the real-time touch operation, wherein:
when the duration of the real-time touch operation is shorter than a first predetermined threshold value, the real-time touch operation is determined as the Type I touch operation,
when the duration of the real-time touch operation is longer than the first predetermined threshold value, the real-time touch operation is determined as the Type II touch operation, and
each of the plurality of different types of touch operations corresponds to a distinct manner of unfolding the multifunction button from a first folded state to a second unfolded state comprising a plurality of single-function buttons oriented around the multifunction button, and wherein the docking location of the multifunction button is adjusted within the movable area in response to a determination of a particular target type of the real-time touch operation;
when the target type of the real-time touch operation is determined to be the Type I touch operation, unfolding, by the processor, the plurality of single-function buttons around the multifunction button; and
when the target type of the real-time touch operation is determined to be the Type II touch operation;
monitoring, by the processor, the real-time touch operation of the multifunction button by the user to determine whether the multifunction button has been moved,
when the multifunction button has been moved, obtaining, by the processor, a moved location of the multifunction button,
dividing, by the processor, the movable area of the interactive user interface into a plurality of subareas,
determining, by the processor, a center of each of the plurality of subareas,
determining, by the processor, an adjusted docking location of the multifunction button as the center of a particular subarea where the moved location is located, and
unfolding, by the processor, the plurality of single-function buttons in a user touch area around the adjusted docking location of the multifunction button.

2. The processor-implemented method according to claim 1, further comprising:
creating, by the processor, the multifunction button by combining the plurality of single-function buttons.

3. The processor-implemented method according to claim 1, wherein obtaining the moved location of the multifunction button comprises:
determining whether a current location of the multifunction button is outside of the movable area of the interactive user interface in a vertical direction;
adjusting a vertical coordinate of the current location of the multifunction button to a second predetermined threshold value; and
maintaining a horizontal coordinate of the current location of the multifunction button.

4. The processor-implemented method according to claim 1, wherein unfolding the plurality of single-function buttons comprises:
evenly unfolding the plurality of single-function buttons into an arc around the multifunction button, wherein the arc has a predetermined radius,
an angle measure of the arc is dependent on the docking location of the multifunction button,
distance between any two neighboring single-function buttons of the plurality of single-function buttons is equal, and
distance between any of the plurality of single-function buttons and the multifunction button is equal.

5. The processor-implemented method according to claim 1, wherein the multifunction button is a semitransparent button.

6. The processor-implemented method according claim 1, wherein unfolding the plurality of single-function buttons further comprise implementing at least one animation of:
moving locations of the single-function buttons;
rotating the single-function buttons; and
creating a dissolving effect of the single-function buttons.

7. A touchscreen device with an interactive user interface, comprising:
a non-transitory processor-readable storage medium storing a set of instructions for conducting operations on the touchscreen device;
a processor in communication with the non-transitory processor-readable storage medium that is configured to execute the set of instructions stored in the non-transitory processor-readable storage medium and is configured to:
monitor a real-time touch operation of the interactive user interface, by a user, wherein a portion of the interactive user interface defines a movable area, a docking location movable within the movable area, and a multifunction button located at the docking location;
determine a target type of the real-time touch operation from a plurality of different types of touch operations comprising a Type I touch operation and a Type II touch operation based on a duration of the real-time touch operation, wherein:
when the duration of the real-time touch operation is shorter than a first predetermined threshold value, the real-time touch operation is determined as the Type I touch operation,
when the duration of the real-time touch operation is longer than the first predetermined threshold value, the real-time touch operation is determined as the Type II touch operation, and
each of the plurality of different types of touch operations corresponds to a distinct manner of unfolding the multifunction button from a first folded state to a second unfolded state comprising a plurality of single-function buttons oriented around the multifunction button, and wherein the docking location of the multifunction button is adjusted within the movable area in response to a determination of a particular target type of the real-time touch operation;
when the target type of the real-time touch operation is determined to be the Type I touch operation, unfold the plurality of single-function buttons around the multifunction button; and
when the target type of the real-time touch operation is determined to be the Type II touch operation;
monitoring the real-time touch operation of the multifunction button by the user to determine whether the multifunction button has been moved,
when the multifunction button has been moved, obtaining a moved location of the multifunction button, dividing the movable area of the interactive user interface into a plurality of subareas, determining a center of each of the plurality of subareas, determining an adjusted docking location of the multifunction button as the center of a particular subarea where the moved location is located, and unfolding, by the processor, the plurality of single-function buttons in a user touch area around the adjusted docking location of the multifunction button.

8. The touchscreen device according to claim 7, wherein the processor is further configured to create the multifunction button by combining the plurality of single-function buttons.

9. The touchscreen device according to claim 7, wherein to obtain the moved location of the multifunction button the processor is further configured to:

determine whether a current location of the multifunction button is outside of the movable area of the interactive user interface in a vertical direction;

adjust a vertical coordinate of the current location of the multifunction button to a second predetermined threshold value; and maintain a horizontal coordinate of the current location of the multifunction button.

10. The touchscreen device according to claim 7, wherein to unfold the plurality of single-function buttons the processor is further configured to:

evenly unfold the plurality of single-function buttons into an arc around the multifunction button, wherein the arc has a predetermined radius, an angle measure of the arc is dependent on the docking location of the multifunction button, distance between any two neighboring single-function buttons of the plurality of single-function buttons is equal, and distance between any of the plurality of single-function buttons and the multifunction button is equal.

11. The touchscreen device according to claim 7, wherein the multifunction button is a semitransparent button.

12. The touchscreen device according claim 7, wherein to unfold the plurality of single-function buttons the processor is further configured to implement at least one animation to generating effect of:

moving locations of the single-function buttons;

rotating the single-function buttons; and dissolving of the single-function buttons.

* * * * *